United States Patent
Marukawa et al.

(10) Patent No.: US 6,654,084 B1
(45) Date of Patent: Nov. 25, 2003

(54) LIQUID CRYSTAL DISPLAY DEVICE WITH A LOOP OF BLACK MATRIX MATERIAL SURROUNDING AN OPPOSING ELECTRODE

(75) Inventors: Yasuo Marukawa, Tottori (JP); Takashi Ikemoto, Tottori (JP); Takuo Kinoshita, Tottori (JP); Hideto Kanazawa, Tottori (JP); Masayuki Kametani, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 116 days.

(21) Appl. No.: 09/959,649

(22) PCT Filed: Jun. 30, 2000

(86) PCT No.: PCT/JP00/04384

§ 371 (c)(1),
(2), (4) Date: Nov. 2, 2001

(87) PCT Pub. No.: WO01/02901

PCT Pub. Date: Jan. 11, 2001

(30) Foreign Application Priority Data

Jul. 6, 1999 (JP) .......................................... 11-192102
Jul. 13, 1999 (JP) .......................................... 11-199488

(51) Int. Cl.[7] ...................... G02F 1/1335; G02F 1/1333; G02F 1/1345
(52) U.S. Cl. ....................... 349/110; 349/106; 349/149; 430/7
(58) Field of Search ............................ 349/110, 106, 349/149; 430/7

(56) References Cited

U.S. PATENT DOCUMENTS 5,488,498 A * 1/1996 Fujii et al. .................. 349/149
6,022,646 A * 2/2000 Kim et al. .................... 430/7

FOREIGN PATENT DOCUMENTS

| JP | 63-287821 | | 11/1988 |
| JP | 2-234122 | | 9/1990 |
| JP | 6-301045 | | 10/1994 |
| JP | 08-122824 | | 5/1996 |
| JP | 408278499 A | * | 10/1996 |
| JP | 40833478 | * | 12/1996 |
| JP | 4093113 | * | 2/1997 |
| JP | 11-14823 | | 1/1999 |
| JP | 11-38906 | | 2/1999 |
| JP | 411072778 A | * | 3/1999 |
| JP | 11-295519 | | 10/1999 |
| JP | 2000-137238 | | 5/2000 |

* cited by examiner

*Primary Examiner*—Julie Ngo
(74) *Attorney, Agent, or Firm*—Rader Fishman & Grauer

(57) ABSTRACT

A liquid crystal display device includes an array substrate having display elements formed in a matrix-like array and an array conductor pattern surrounding the matrix-type display in a common plane therewith a filter substrate having a color filter and an opposing electrode formed in facial contact thereon with the color filter having an endless loop of black matrix material extending peripherally thereabouts and in contact with the opposing electrode, a sealing member laid in a shape of an endless loop between the array and filter substrate in peripheral portions thereof and extending between and in electrical contact with the array conductor pattern and the endless loop of black matrix material surrounding the opposing electrode, liquid crystal sealed in a region enclosed by the sealing member and a connecting member for electrically connecting the array and filter substrate together in the peripheral portions thereof outside the sealing member.

4 Claims, 5 Drawing Sheets

LIQUID CRYSTAL DISPLAY DEVICE WITH A LOOP OF BLACK MATRIX MATERIAL SURROUNDING AN OPPOSING ELECTRODE

TECHNICAL FIELD

The present invention relates to a liquid crystal display device having liquid crystal sealed in a space secured between an array substrate and a filter substrate.

BACKGROUND ART

As FIGS. 7 and 8 show, a conventional liquid crystal display device 101 is provided with an array substrate 103 having display elements 102 (each composed of, for example, a thin-film transistor and a pixel electrode connected thereto) formed in a matrix-like array and a filter substrate 106 having an opposing electrode 105 (a transparent electrode made of ITO or the like) formed thereon with a color filter 104 and an insulating layer OC sandwiched in between. The opposing electrode 105 is, all around or at part of the periphery thereof, so formed as to cross and reach beyond a sealing member 107 provided between the two substrates 103 and 106, thereby forming a lead portion. Through this lead portion, the two substrates 103 and 106 are electrically connected together by a connecting member 109 outside the sealing member 107. The region enclosed by the sealing member 107 is filled with liquid crystal 108.

However, in this structure, where the opposing electrode 105 crosses the bonding surface of the sealing member 107 as described above, the sealing member 107 is kept in intimate contact with the opposing electrode 105. As a result, under the negative pressure applied when the liquid crystal 108 is injected, the adhesion between the filter substrate 106 and the sealing member 107 is insufficient, degrading the hermeticity of the liquid crystal display device 101. The factor that degrades the hermeticity between the filter substrate 106 and the sealing member 107 is either insufficient adhesion between the opposing electrode 105 and the sealing member 107 or insufficient adhesion between the opposing electrode 105 and the insulating layer OC laid thereunder. In particular, as multiple layer structure becomes increasingly common in that portion of the filter substrate 106 which serves as the base layer to which the sealing member 107 is bonded, the base layer portion tends to exhibit poorer adhesion. An object of the present invention is to increase adhesion between a sealing member and a filter substrate.

On the other hand, the color filter 104 provided on the filter substrate 106 are composed of color elements (R, G, and B) arranged in a known arrangement, such as a stripe arrangement, mosaic arrangement, or delta (triangular) arrangement. Whereas low-resolution products adopt a mosaic or delta arrangement, high-resolution products adopt a stripe arrangement.

FIG. 9 is a sectional view of the conventional liquid crystal display device 101, taken along the direction in which the stripes of the color filter 104 are arranged. As this figure shows, on a transparent substrate 110 (made of glass or the like) of the array substrate 103 are formed gate conductors 112 for scanning and source conductors (not shown) for signal transfer, and within the regions demarcated by those conductors are formed display elements 102 each composed of a thin-film transistor (not shown) and a pixel electrode 111 (a transparent electrode made of ITO or the like) connected thereto. The greater parts of the individual pixel electrodes 111 are located within the demarcated regions mentioned above, and are laid on a layer insulation film 116 composed of a single layer or multiple layers. The remaining parts of the individual pixel electrodes 111, however, are located out of the demarcated regions mentioned above, and are laid over the gate conductors 112 with the gate insulation film 116 sandwiched in between.

On a transparent substrate 114 (made of glass or the like) of the filter substrate 106 are formed the color filter 104 provided with R, G, and B color elements, light-shielding patches constituting a black matrix 104K, and the opposing electrode 105 covering all these. The color filter 104, adopting a stripe arrangement, have their constituent color elements arranged so as to form stripes of different colors; that is, color elements of an identical color are arranged along each of the source conductors for signal transfer on the black matrix 104K. As the figure shows, the color filter 104, having a stripe arrangement, is formed continuously so as to cover the black matrix 104K.

However, in this structure, where the color filter 104 covers the black matrix 104K completely as described above, on the surface of the color filter 104 are formed elevated portions C that project toward the gate conductors 112 and the source conductors. This makes it difficult to stably hold spacers (not shown) for securing cell gaps on the gate conductors 112 and the source conductors. Moreover, the presence of the elevated portions C shortens the distances from the opposing electrode 105 to the gate conductors 112 and the source conductors, and thereby contributes to the emergence of parasitic capacitance. Another object of the present invention is to stabilize cell gaps. Still another object of the present invention is to reduce the parasitic capacitance appearing between an opposing electrode and gate and source conductors.

DISCLOSURE OF THE INVENTION

To achieve the above objects, according to the present invention, a liquid crystal display device is provided with: an array substrate having display elements formed in a matrix-like array; a filter substrate having a color filter and an opposing electrode formed thereon; a sealing member laid in the shape of a loop between the array and filter substrates in peripheral portions thereof, liquid crystal sealed in the region enclosed by the sealing member; and a connecting member for electrically connecting the array and filter substrates together in the peripheral portions thereof outside the sealing member. Here, a black matrix made of a metal and constituting part of the color filter and the opposing electrode are electrically connected together, and the black matrix and the opposing electrode are both so formed as to reach the peripheral portion of the filter substrate. Moreover, a region that is not covered by the opposing electrode is secured in the shape of a loop on the black matrix. The sealing member is arranged in this loop-shaped region.

Preferably, the black matrix is so formed as to be kept in direct contact with the opposing electrode.

Preferably, the opposing electrode is formed on the black matrix in a peripheral portion thereof outside the sealing member.

Preferably, the array substrate has, in a portion thereof lying inside the peripheral portion thereof, demarcated regions demarcated by a plurality of scanning conductors and signal-transfer conductors, and the display elements are each composed of a transistor and a pixel electrode, and are arranged individually in the demarcated regions. Moreover, the black matrix has openings formed therein so as to correspond to the demarcated regions, and the color filter adopts a stripe arrangement in which the openings located along each signal-transfer conductor are covered with color elements of an identical color, with grooves formed at boundaries between color elements of an identical color so that the black matrix is exposed through the grooves.

Preferably, the array substrate has, in a portion thereof lying inside the peripheral portion thereof, demarcated regions demarcated by a plurality of scanning conductors and signal-transfer conductors, and the display elements are each composed of a transistor and a pixel electrode, and are arranged individually in the demarcated regions. Moreover, the transistors and the pixel electrodes are arranged directly on a transparent substrate of the array substrate.

BEST MODE FOR CARRYING OUT THE INVENTION

Figure 1:
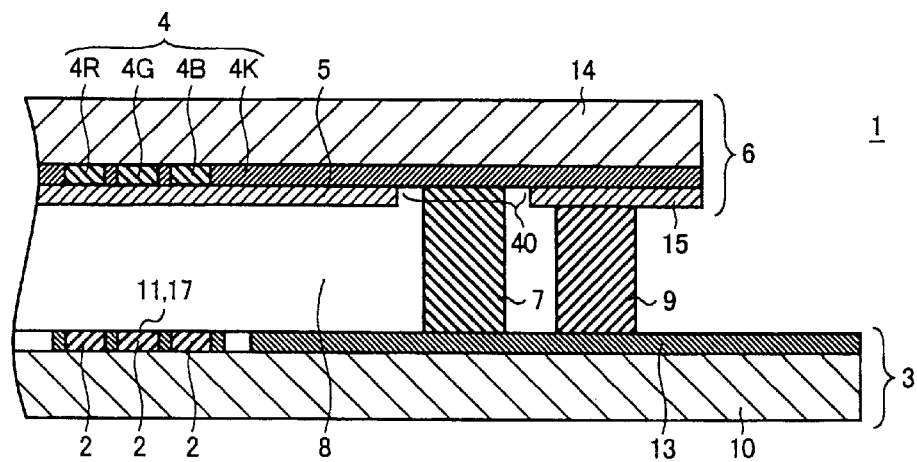
FIG. 1 is a sectional view of a principal portion of the liquid crystal display device 1 of a first embodiment of the invention (the portion corresponding to line I—I shown in FIG. 3).
Figure 2:
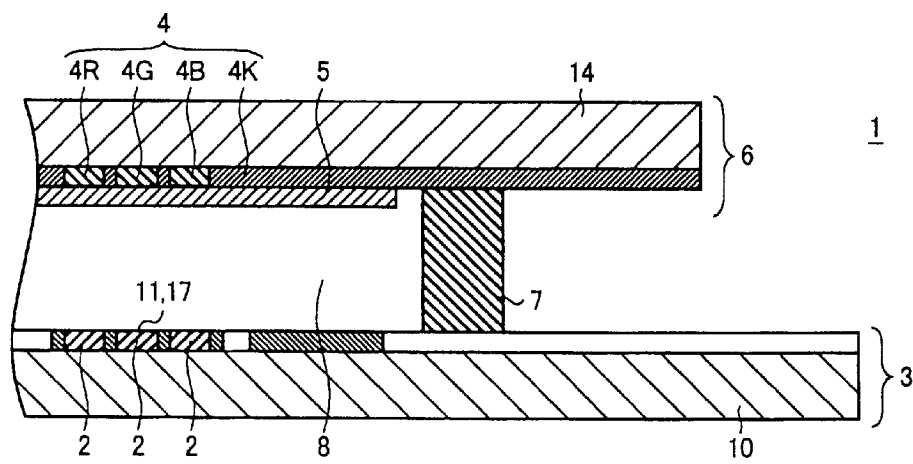
FIG. 2 is a sectional view of a principal portion of the first embodiment (the portion corresponding to line II—II shown in FIG. 3).
Figure 3:
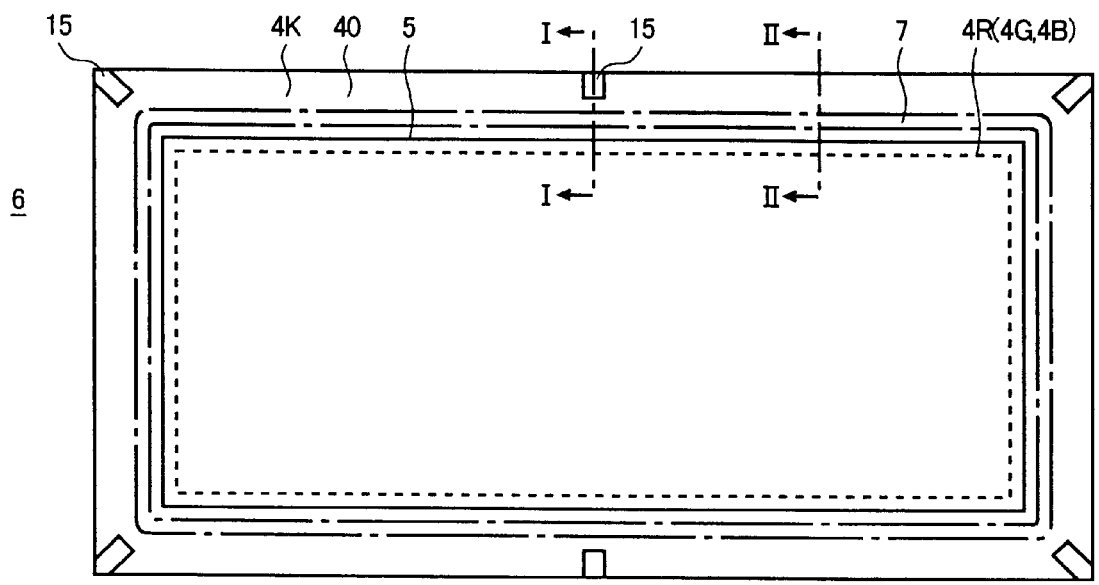
FIG. 3 is a bottom view of the filter substrate 6 of the first embodiment.

First, a first embodiment of the invention will be described. As FIGS. 1 to 3 show, a liquid crystal display device 1 is provided with an array substrate 3 having a plurality of display elements 2 formed on a transparent substrate 10 (made of glass or the like) and a filter substrate 6 having a color filter 4 and an opposing electrode 5 formed on a transparent substrate 14 (made of glass or the like). Between the two substrates 3 and 6 is provided a sealing member 7, and the region enclosed by the sealing member 7 is filled with liquid crystal 8. Moreover, outside the sealing member 7 is provided a connecting member 9 for electrically connecting the two substrates 3 and 6 together. As required, those surfaces of the two substrates 3 and 6 which face each other have orientation films (not shown), made of polyimide or the like, formed thereon and are subjected to an orientation process such as rubbing. In this liquid crystal display device 1, external light (backlight) is shone onto the filter substrate 6 from the array substrate 3 side thereof On the transparent substrate 10 of the array substrate 3, the plurality of display elements 2 are arranged in a matrix-like array. The display elements 2 are each composed of a switching device, for example a thin-film transistor 17, and a pixel electrode 11 connected thereto. The display elements 2 are electrically connected individually to scanning conductors, used to achieve scanning, and signal-transfer conductors, used to transfer signals, that are arranged in the X and Y directions in a grid-like pattern. In a peripheral portion of the array substrate 3 are formed a conductor pattern 13 providing connection to the opposing electrode 5 and a terminal portion (not shown) for external connection.

On the transparent substrate 14 of the filter substrate 6, a black matrix 4K constituting part of the color filter 4 is formed over the entire surface so as to reach a peripheral portion of the filter substrate 6. The black matrix 4K is made of a metal (such as chromium) that offers good light-shielding and electrical conducting properties. The black matrix 4K has, in a peripheral portion thereof, a region in which a metal layer is shaped like a frame and, in a central portion thereof (i.e. in the portion other than the peripheral portion), a region in which a metal layer is shaped like a mesh. On this mesh region of the black matrix 4K, the color filter 4 has its constituent color, i.e. red, green, and blue, elements 4R, 4G, and 4B formed in such a way that part of the surface of the black matrix 4K is exposed. On the color filter 4 formed in this way, the opposing electrode 5 is formed directly, without interposing a transparent coat (an OC layer) for flattening or insulation. This permits the exposed part of the black matrix 4K to make contact with the opposing electrode 5, achieving electrical connection therebetween.

Moreover, in this embodiment, as a region in which to arrange the sealing member 7, a sealing member arrangement region 40 that is not covered by the opposing electrode 5 is secured in the shape of a loop so as to surround the mesh region of the black matrix 4K (i.e. the effective display region in which the color elements 4R, 4G, and 4B and the opposing electrode 5 are formed). Within this sealing member arrangement region 40, the metal layer constituting the black matrix 4K is exposed, offering increased adhesion to the sealing member 7.

Outside the sealing member arrangement region 40 (i.e. on the right in the figure), a conductor pattern 15 on which to arrange the connecting member 9 is formed by using the material of which the opposing electrode 5 is made, and, on the array substrate 3, the conductor pattern 13 is formed so as to face the conductor pattern 15. These two conductor patterns 13 and 15 are connected together by the connecting member 9, which is made of a conductive adhesive including conductive particles of gold, silver, or the like. As a result, the opposing electrode 5 formed on the filter substrate 6 is, by way of the black matrix 4K, the conductor patterns 13 and 15, and the connecting member 9, electrically connected to the circuit of the array substrate 3 outside the sealing member 7. The black matrix 4K itself may be used as the conductor pattern 15, in which case the conductor pattern 15 does not necessarily have to be provided separately.

As described above, in this liquid crystal display device 1, a region 40 that is not covered by the opposing electrode 5 is secured in the shape of a loop on the black matrix 4K, and the sealing member 7 is arranged in this loop-shaped region 40. This permits the sealing member 7 to be bonded directly to the black matrix 4K, increasing the adhesion therebetween and thereby reducing the occurrence of defects such as part of the sealing member 7 peeling off the filter substrate 6. In particular, the filter substrate 6 has only one layer, i.e. the black matrix 4K, as the layer that serves as the base layer to which the sealing member 7 is bonded, and in addition the layer of the black matrix 4K is formed by sputtering, metal vapor deposition, or the like and thus exhibits excellent adhesion to the transparent substrate 14. Thus, increased adhesion is achieved between the filter substrate 6 and the sealing member 7.

Figure 4:
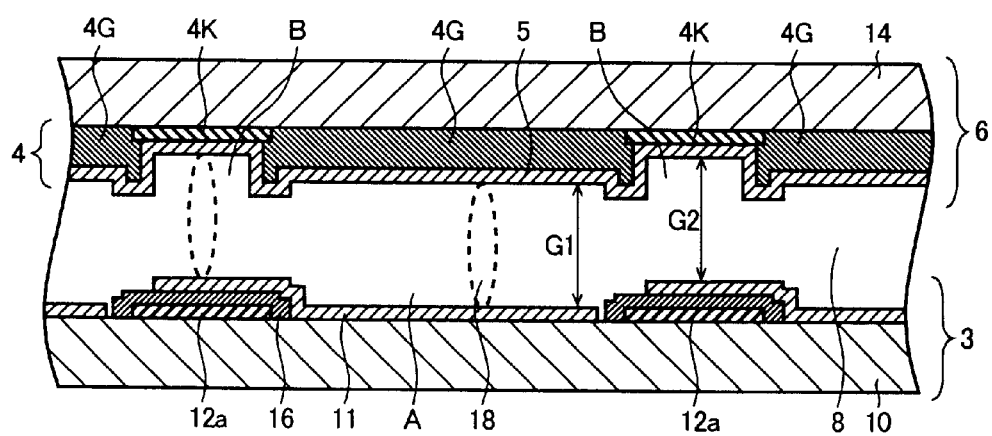
FIG. 4 is a sectional view of a principal portion of the liquid crystal display device 1 of a second embodiment of the invention (corresponding to line III—III shown in FIG. 6).
Figure 5:
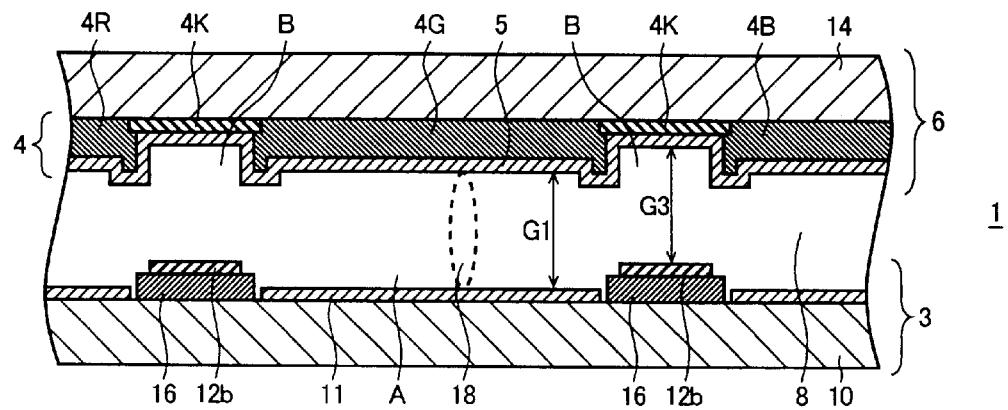
FIG. 5 is a sectional view of a principal portion of the second embodiment (corresponding to line IV—IV shown in FIG. 6).
Figure 6:
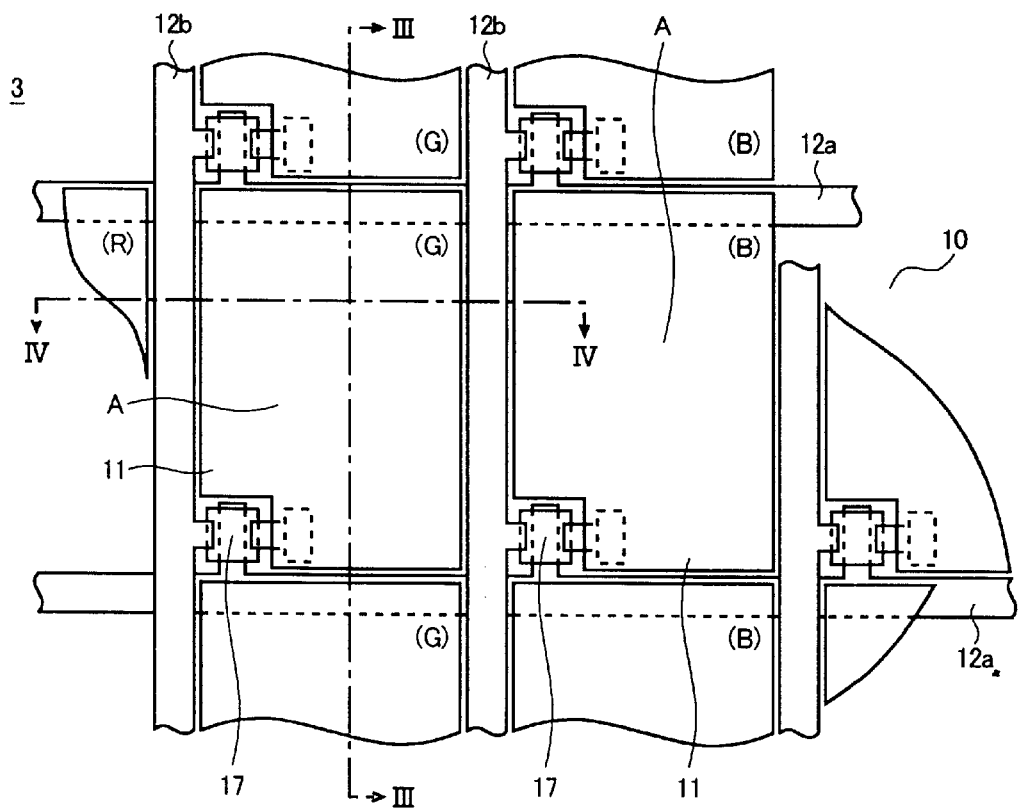
FIG. 6 is a plan view of the array substrate 3 of the second embodiment.
Figure 7:
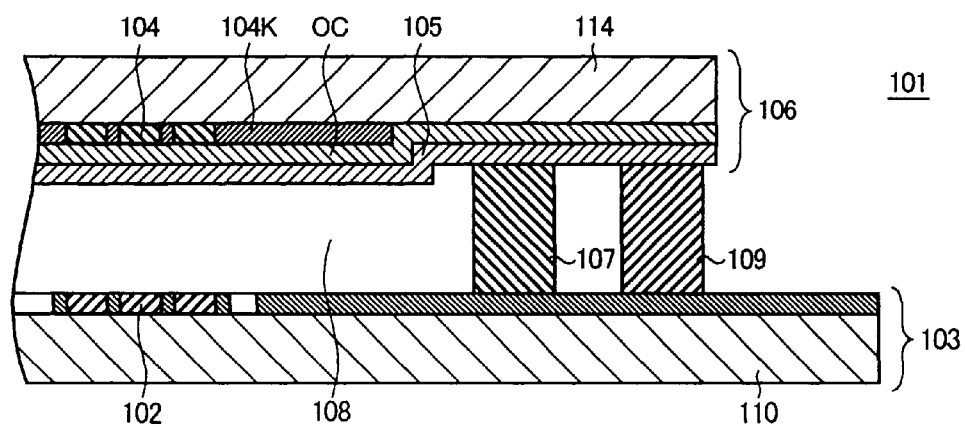
FIG. 7 is a sectional view of a principal portion of a conventional example (corresponding to line V—V shown in FIG. 8).
Figure 8:
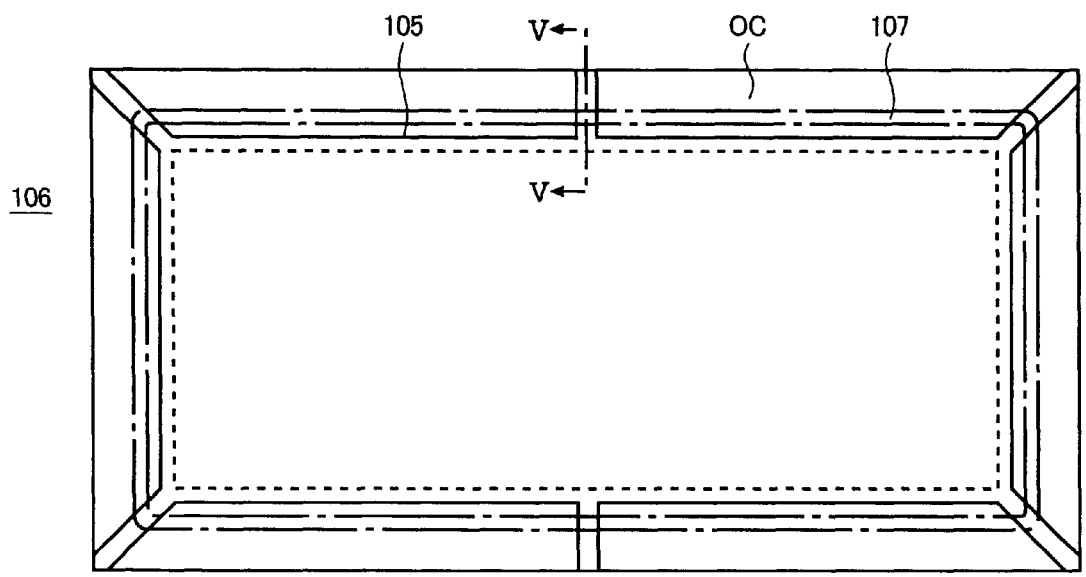
FIG. 8 is a bottom view of the filter substrate 6 of the conventional example.
Figure 9:
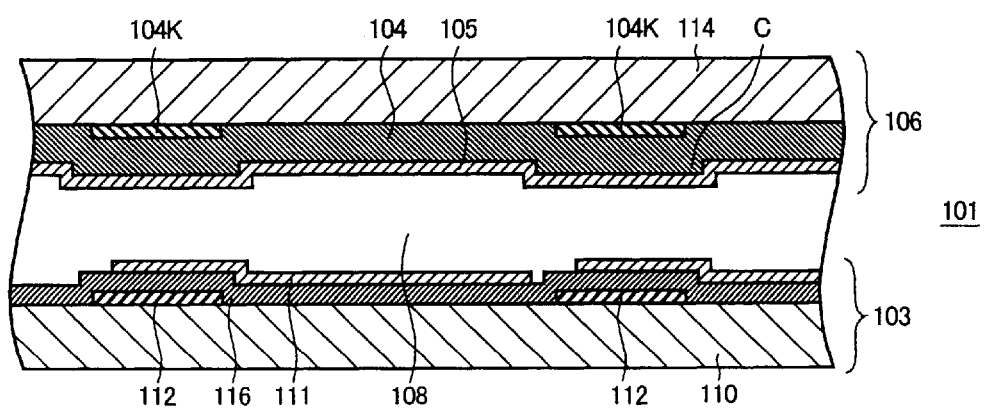
FIG. 9 is a sectional view of a principal portion of the conventional example (corresponding to FIG. 4).

Next, a second embodiment of the invention will be described with reference additionally to FIGS. 4 to 6. As FIGS. 4 and 5 show, on a transparent substrate 10 of an array substrate 3 are formed gate conductors 12a (for scanning) and source conductors 12b (for signal transfer). Moreover, as FIG. 6 shows, within a plurality of regions A demarcated by these conductors 12a and 12b, display elements 2 are arranged individually that are each composed of a thin-film transistor 17 and a pixel electrode 11 connected thereto. The pixel electrodes 11 are formed as transparent electrodes made of ITO (indium tin oxide) or the like. The greater parts of the individual pixel electrodes 11 are located within the demarcated regions A, and are laid so as to be kept in direct contact with the transparent substrate 10.

In this way, in this embodiment, the pixel electrodes 11 are formed directly on the transparent substrate 10 without interposing a layer insulation film such as a gate insulation film 16, and therefore the array substrate 3 side surfaces of the demarcated regions A are depressed as compared with the surface around. This eliminates the absorption of light by the aforementioned layer insulation film and thereby enhances the efficiency with which light is used in the effective display region. That is, with the same output of light from an illumination device for backlighting, the liquid crystal display device 1 offers higher surface brightness than is conventionally obtained. Conversely, the same surface brightness is obtained with lower power consumption by the aforementioned illumination device.

This liquid crystal display device 1 is of the type that exploits the gate conductors 12a to produce auxiliary capacitance, and therefore, to produce auxiliary capacitance, parts of the individual pixel electrodes 11 are laid over the gate conductors 12a with a gate insulation film 16 sandwiched in between.

On the other hand, on a transparent substrate 14 of a filter substrate 6 is laid a color filter 4, and a transparent opposing electrode 5 made of ITO or the like is laid so as to cover the color filter 4. In some cases, a flattening film (an OC layer) made of acrylic resin or the like is interposed between the opposing electrode 5 and the color filter 4. However, forming this flattening film may degrades the function of the grooves B described later, and therefore, in the example under discussion, the opposing electrode 5 is formed directly on the color filter 4. Moreover, a black matrix 4K constituting part of the color filter 4 is made of a metal or resin having a light-shielding property, and has a plurality of openings formed therein that have similar shapes to the demarcated regions A. The color filter 4 has its constituent color elements 4R, 4G, and 4B arranged in a stripe arrangement so as to cover the openings of the black matrix 4K, with color elements of an identical color arranged along each of the source conductors 12b for signal transfer.

Here, the individual color elements 4R, 4G, and 4B are so arranged as to be surrounded by the black matrix 4K. Specifically, as the figures show, grooves B for separation are formed at the boundaries between color elements of an identical color (in FIG. 4, at the boundaries between the color elements 4G) and also at the boundaries between color elements of different colors (in FIG. 5, at the boundaries between the color elements 4R, 4G, and 4B). Through these grooves B, parts of the surface of the black matrix 4K are exposed. Thus, in the surface of the filter substrate 6, grooves B having a depth corresponding to the thickness of the color elements 4R, 4B, and 4G are formed in positions facing the gate conductors 12a and the source conductors 12b, and these grooves B serve to restrain the movement of spacers 18 for securing cell gaps.

These grooves B also serve to lengthen the distances from the gate conductors 12a and the source conductors 12b to the opposing electrode 5 and thereby reduce the parasitic capacitance around the thin-film transistors 17. The grooves B further serve to widen the cell gaps G2 and G3, i.e. the cell gaps secured where the gate conductors 12a and the source conductors 12b are formed, in accordance with the cell gaps G1, i.e. the cell gaps secured in the demarcated regions A, that have been made somewhat wider than are conventionally secured as a result of the removal of the aforementioned layer insulation film such as the gate insulation film 16. Here, the depth of the grooves B is made equal to the thickness of the color elements 4R, 4G, and 4B. However, by controlling the process (such as etching) by which the grooves B are formed, it is possible to give them a desired depth that is smaller than the thickness of the color elements 4R, 4G, and 4B. By controlling the depth of the grooves B in this way, it is possible to make the cell gaps G2 and G3 equal to the cell gaps G1 even in cases where the cell gaps G1 are increased or decreased as a result of a design change on the part of the array substrate 3.

As described above, in this embodiment, a stripe arrangement is achieved by arranging color elements of an identical color along each of predetermined conductors (in the example under discussion, the source conductors 12b), and in addition grooves B for separation are formed also at the boundaries between adjacent color elements of an identical color. As a result, as opposed to a conventional stripe arrangement without grooves B, it is possible to hold spacers 18 stably on conductors (the source conductors 12b) and thereby keep cell gaps constant. Moreover, it is possible to reduce the parasitic capacitance along conductors (the gate conductors 12a and the source conductors 12b).

INDUSTRIAL APPICABILITY

As described above, the present invention is useful in liquid crystal display devices having liquid crystal sealed in a space secured between an array substrate and a filter substrate. Specifically, the present invention makes it possible to eliminate overlaps between the filter substrate and a sealing member that is provided between the two substrates. This helps enhance the hermeticity of liquid crystal display devices so that they offer satisfactory display quality for a prolonged period. Moreover, the present invention makes it possible to keep cell gaps constant, and also to reduce unwanted parasitic capacitance and thereby enhance display quality. Furthermore, the present invention makes it possible to eliminate a layer insulation film in the effective display region so that light is used efficiently.

What is claimed is:

1. A liquid crystal display device comprising:
    an array substrate having display elements formed in a matrix-like array and an array conductor pattern surrounding the matrix-type display in a common plane therewith;
    a filter substrate having a color filter and an opposing electrode formed in facial contact thereon, the color filter having an endless loop of black matrix material extending peripherally thereabouts and in contact with the opposing electrode;
    a sealing member laid in a shape of an endless loop between the array and filter substrate in peripheral portions thereof and extending between and in electrical contact with the array conductor pattern and the endless loop of black matrix material surrounding the opposing electrode;
    liquid crystal sealed in a region enclosed by the sealing member; and a connecting member for electrically connecting the array and filter substrate together in the peripheral portions thereof outside the sealing member.

2. A liquid crystal display device as claimed in claim 1, wherein the black matrix and the opposing electrode are electrically connected together, the black matrix and the opposing electrode are so formed as to reach the peripheral portion of the filter substrate, and the loop-shaped region that is not covered by the opposing electrode is secured on the black matrix in the peripheral portion of the filter substrate, the opposing electrode being formed on a portion of the black matrix where a connecting member electrically connects the two substrates together.

3. A liquid crystal display device as claimed in claim 1, wherein the array substrate has, in a portion thereof lying inside the peripheral portion thereof, demarcated regions demarcated by a plurality of scanning conductors and signal-transfer conductors, the display elements are each composed of a transistor and a pixel electrode, and are arranged individually in the demarcated regions, an internal black matrix has openings formed therein so as to correspond to the demarcated regions, and the color filter adopts a stripe arrangement in which the openings located along each signal-transfer conductor are covered with color elements of an identical color, with grooves formed at boundaries between color elements of an identical color so that the internal black matrix is exposed through the grooves.

4. A liquid crystal display device as claimed in claim 1, wherein the array substrate has, in a portion thereof lying inside a peripheral portion thereof, demarcated regions demarcated by a plurality of scanning conductors and signal-transfer conductors, the display elements are each composed of a transistor and a pixel electrode, and are arranged individually in the demarcated regions, and the transistors and the pixel electrodes are arranged directly on a transparent substrate of the array substrate.

* * * * *